Jan. 4, 1938.  A. J. NOEL  2,104,435

MACHINE TOOL SPINDLE

Filed Dec. 14, 1935

INVENTOR
Alfred J. Noel
by Arthur A. Johnson
ATTORNEY

Patented Jan. 4, 1938

2,104,435

UNITED STATES PATENT OFFICE 2,104,435

MACHINE TOOL SPINDLE

Alfred J. Noel, Stratford, Conn., assignor to The Bodine Corporation, Bridgeport, Conn., a corporation of Connecticut Application December 14, 1935, Serial No. 54,422

7 Claims. (Cl. 10—129)

This invention relates to drilling and/or tapping machines, and is more particularly adaptable to that type thereof in which a plurality of spindles are driven from a substantially centrally-located master-gear, and are journaled in bearings capable of being differently distanced radially from the center thereof, as well as from each other, to meet various conditions in properly adjusting the spindles to the locations of the holes which are to be drilled or tapped in the work.

The invention has for one of its objects: to simplify the construction of the spindles and to construct them in such a manner that the general mode of their support and the driving mechanism, from the central gear to the chuck-carrying spindle, will be the same.

Another object of the invention is: to minimize the time required in substituting a drill-spindle for a tap-spindle and vice-versa, and to obviate the necessity of removing the holder or disturbing the driving mechanism (after it has been accurately adjusted and located) to effect the change.

The invention has, furthermore, for its object, to materially reduce the frictional resistance which has heretofore been in evidence between the spindle-carrier and its driver during the longitudinal sliding movement of the spindle incidental to a tap moving into the work under heavy torque.

Other objects of the invention will hereinafter be apparent; while the scope of protection contemplated will be defined in the claims.

Inasmuch as the types of machines to which the invention is especially applicable are well known, and since the present invention is confined to the tool-unit, the drawing illustrates the latter only.

Figures 1, 2, 3, 4, 5, 6, 7, 8:
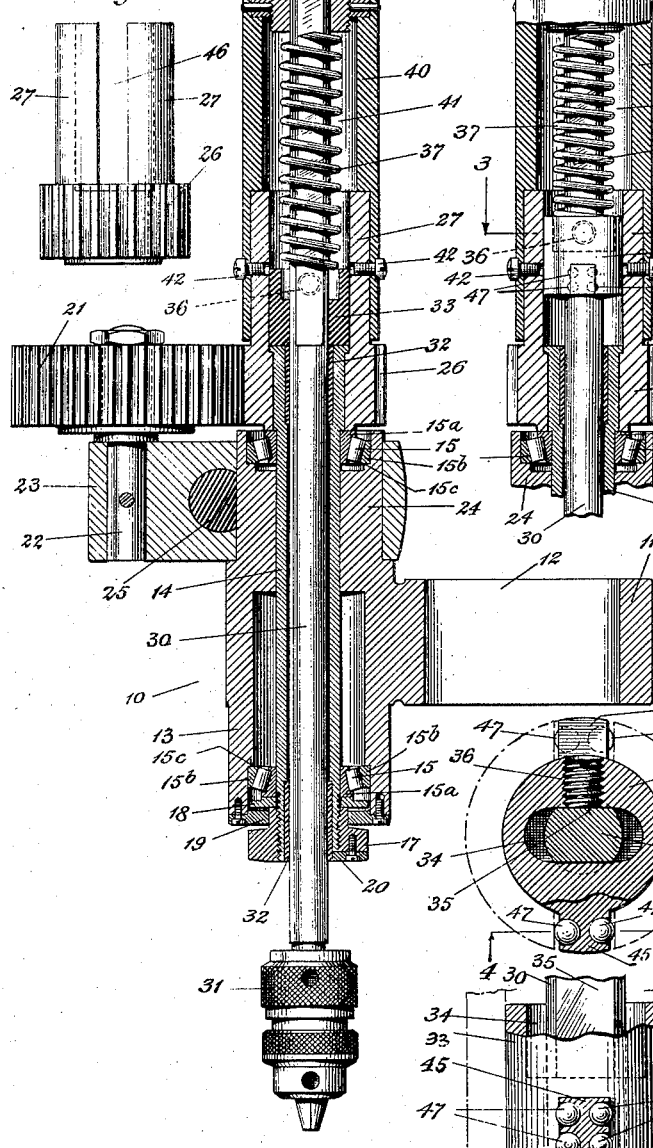
Figure 1 is a central longitudinal vertical section of the tap-spindle in its normal and non-active position in its holder.
Fig. 2 shows the upper portion of the tap spindle when operative on a piece of work supported on a table (not shown).
Fig. 3 is a section of the tap-carrying head taken on line 3—3 of Fig. 2, the parts being shown on an enlarged scale.
Fig. 4 is a front view of the same, a portion being shown in section, on line 4—4 of Fig. 3.
Fig. 5 is an elevation of the spindle-driver.
Fig. 6 shows a top view thereof.
Fig. 7 is a view similar to Fig. 1, but shows a drill-spindle substituted for the tap-spindle.
Fig. 8 is a section on line 8—8 of Fig. 7.

As above stated, the present invention deals with a tool-supporting unit comprising several elements which are used without change for either a drill spindle or a tap spindle, and so that their locations in the machine may also remain unaltered, and consequently there need be no readjustment of the tool-supporting unit to bring a substitute for either the drill or tap-spindle into exact realignment with the locations where the tools are required to operate on the work.

In the drawing, 10 denotes the spindle-housing having the ordinary offset extension 11 slotted as usual, as at 12, to enable a clamping-bolt (not shown) to pass therethrough and permit a wide range of adjustment on the machine-slide to bring the tool-spindle supported by said extension into exact vertical position to operate on the work which is supported below it. The tool-supporting portion of the housing 10 comprises a vertical barrel 13 in which is supported a quill 14 journaled near its upper and lower ends in roller bearings 15 held in the barrel 13, the quill 14, therefore, being freely rotatable in the barrel 13, while it is held against movement downwardly by being press-fitted in and shouldered against the upper face of the inner race 15a of the upper roller bearing 15.

Also, rising movement of the quill 14 relative to the barrel 13 is prevented at the lower end of the latter by an adjusting nut 17 in screw-threaded engagement with the lower end of the quill 14 and abutting a washer 18 which, in turn, contacts with the underside of the inner race 15a of the lower roller bearing 15. A cap ring 19 secured to the lower end of the housing-barrel 13 and fitting closely on the body of the nut 17 will keep the roller-bearing free from dust, etc. It will also be understood that, by virtue of the construction just described, a very fine adjustment of longitudinal clearance of the quill 14 relative to the barrel may be obtained and retained, the nut 17 being held in adjusted position on the quill by a check-clamp 20, attached to the nut, as shown in Fig. 1.

Inasmuch as the outer races 15b of both roller bearings are unchangeably seated against shoulders 15c provided for them in both ends of housing-barrel, and the upper end of the quill 14 is shouldered to engage the upper face of the inner race 15a of the upper roller bearing, while the adjusting nut 17 on the lower end of the quill 14 engages (through the intervention of the washer 18) the underside of the inner race 15a of the lower roller bearing 15, the contact-pressures between the rollers and the inner and outer races of both bearings will become equalized, the quill 14 will be maintained in true central position in the housing, and all "end-shake" of the quill in the barrel may be eliminated, depending upon the adjustment of the nut 17.

The quill 14 constitutes the member to which a tool, such as a drill, or tap, or reamer, etc. may be attached, either directly or indirectly, and is, therefore, the driven member of the unit, and operated by a motor-driven gear (not shown) substantially centrally disposed in the machine and driving an intermediate pinion 21 journaled on a stud 22 which is carried by, and fixed in, the free end of an arm 23 mounted for swinging movement on the cylindrical hub 24 at the upper end of the housing-barrel 13, where it may be secured in adjusted position by a binder-pin 25 of ordinary construction.

The intermediate pinion 21 is in permanent mesh with the primary power driven member of the unit, shown herein as a spindle-pinion 26 concentric with and press-fitted on the upper end of the quill 14 so that, when the intermediate gear 21 is rotated, the quill will also be rotated, but naturally in reverse direction, the pinion 26 having an upwardly extending hub-sleeve 27 through which a driving connection with the tool may be established, as required.

All the parts of the unit thus far described are what may be called "standard" for various tool-carrying spindles which are to be used in the machine, the tap-spindle organization being shown in Figs. 1–6 inclusive. In Fig. 1, the tool spindle 30, which carries a chuck 31 to receive a tap, is guided and slidable in bushings 32 pressed into the upper and lower ends of the quill 14 but removable therefrom to be replaced by others, in case of sliding-wear. The spindle is here shown in its lowest or inoperative position, viz.: before a tap in the chuck is brought into contact with the work, and it is thus normally maintained as follows: The upper portion of the cylindrical spindle 30 passes through and is longitudinally adjustable in a driver head 33 provided with an oblong perforation 34 (see Fig. 3) to match the flatted opposite sides 35 of the spindle 30, thus coupling these two parts for co-rotation in either direction, while a set screw 36 binds them together for longitudinal movement in the pinion sleeve 27.

Resting with its lower end against the upper face of the head 33 is a spring 37 whose upper end abuts against the lower end-face of a cylindrically-bored tension-adjuster 38 which is screw-threaded in a collar 39 pinned to the upper end of a shell 40. The latter extends downwardly to the pinion sleeve 27 to form a spring chamber 41, and is secured to the sleeve by screws 42. By rotating the adjuster 38 in proper direction, the tension of the spring (to yieldingly force the head 33 downward) may be varied as desired, a check-nut 43 being preferably used to hold the adjuster in position. The upper end of the spindle 30 extends freely through the adjuster and carries a stop collar 44 for limiting the downward movement of the spindle 30 relative to the head 33, the collar-screw 44a permitting the collar to follow the adjusting movement of the adjuster without affecting the position of the spindle.

By virtue of the assemblage just described, and when clutching the head 33 to the sleeve 27, the spindle 30 will be positively driven in either direction, but it was found in practice that when a large-size tap is laboring under heavy torque, the frictional resistance to the sliding movement of the spindle in its support is so great as to produce undue wear and to require extra power to overcome it. My invention, therefore, includes as one of its features, the provision of means whereby this frictional resistance will be minimized, and this means is preferably applied to the spindle-driving head 33 which, as above explained, is secured to the spindle 30 by the set screw 36 and, therefore, moves with it vertically in the pinion-sleeve 27, which latter constitutes the direct driver for the head. In order to clutch the head 33 to the pinion-sleeve 27 for balanced co-rotation, the head 33 is provided with a pair of oppositely-projecting lugs 45 adapted for vertical travel in a pair of oppositely-disposed vertical slots 46 (see Figs. 5 and 6) cut out of the pinion-sleeve 27, therefore allowing the head to move vertically in the sleeve when the entire unit is depressed to start the tap (in the chuck) into the hole prepared for it in the work, at which time the spring 37 will naturally become compressed, as shown in Fig. 2. A tap cutting its way into the work, naturally meets considerable resistance rotatively, and this resistance is transmitted to the driving faces on the sides of the lugs 45 which are preferably located at diametrically opposite sides of the head and which contact with the contact-faces of the slot-walls in the pinion-sleeve, so that there would be considerable friction between these contacting faces which, in turn, calls for additional power to overcome.

In order to avoid this friction of the lugs 45 in the slots 46, I provide, preferably in both side faces of the lugs 45, anti-friction members, such as balls 47, interposed between the driving and contact faces. The contours of these balls project just sufficiently beyond the side faces of the lugs to prevent them from contacting with the slot-walls, and practice has demonstrated the fact that this construction practically obviates all resistance to free vertical movement of the head 33 in the pinion-sleeve 27, and considerable power is saved thereby.

In substituting a drill-spindle for the tap-spindle above described, all the lower parts of the unit may be left undisturbed. As the drill-spindle does not require the upper yielding elements or the antifriction drive of the tap-spindle, the upper parts required for drilling may be made smaller and less in number, and the preferred construction is illustrated in Figs. 7 and 8. Here it will be noted that the pinion 260, which is like the pinion 26 above described, has its sleeve 270 interiorly bored into non-circular or irregular form to receive a correspondingly-shaped collar or head 330 which is adapted for free longitudinally-sliding movement vertically in the sleeve but has to rotate with it. This head has an oblong aperture 340 through which the drill spindle 300 may freely move longitudinally but will be rotated with it by virtue of the flat faces 350 of the spindle fitting the narrow part of the aperture 340 (see Fig. 8). In other words: The head 330 acts like a sliding key for causing co-rotation of the spindle 300 with the pinion sleeve 270. At its extreme upper end the drill spindle 300 is cylindrically reduced, as at 300a, to form a shoulder 300b contacting the lower end-face of an adjuster 380 which has a knurled head 380a for hand-manipulation, and is in screw-threaded engagement with a cap 390 tightly screwed into the upper end of the sleeve 270. A check nut 430 holds the adjuster 380 in fixed position, while the spindle 300 is fixed in the adjuster 380 by a nut 380b applied to the upper end of the reduced spindle-end 300a.

It will, therefore, be understood that, by turning the adjuster 380 in the cap 390, the drill spindle 300 may be raised or lowered relatively to the driving mechanism for accurately gauging the depth of the drilled hole when the unit is in a certain predetermined position vertically relative to the work.

In the majority of machines of the multi-spindle type, all the spindle units set up for work are adapted either for drilling or for tapping, and secured in proper locations on top of a table slide to which a downward and reverse movement is imparted for bringing all the tools into and out of action on a number of corresponding workpieces properly placed on a vertically stationary platen supported by the machine frame or base. Now, if the spindle-carrying units, which are clamped to the table slide, are all alike, while only a small number of the spindle-holder parts are different (for the drills or the taps respectively) but still may all be organized with the clamped units, it is evident that, considered from a machine-manufacturing standpoint, a considerable saving is effected on account of larger unit mass production.

Furthermore, considering the instance of a machine shop which may require one of these machines with perhaps five spindles, the shop would only need five of the more expensive and now standardized table-units complete from intermediate gear to spindle pinion, five drill spindles and their special outfit, and five tap spindles with their special equipment, all the spindle equipments being comparatively inexpensive and interchangeably fitting any and all of the table units. It is self-evident that considerable saving in investment will, therefore, result, especially for the reason that the substitution of one set of spindles for another set can be easily and quickly effected, even by unskilled labor.

Variations and modifications may be made within the scope of this invention and portions of the improvements may be used without others.

I claim:

1. A tool unit comprising a housing; a quill rotatable therein; a spindle within the quill; antifriction journalling means for the unit wholly located between the upper and lower limits of the housing; the quill at its upper portion extending above the top of the housing, and the spindle at its upper end extending above the top of the quill; a sleeve carrying at its lower end a spur pinion, said upper portion of the quill being extended into the lower end of the sleeve; a driver head for the spindle sleeving the same and secured thereto and located in the sleeve above the quill, the sleeve being longitudinally slotted opposite the driver head and the latter having a lug extended into said slot; and a superstructure for the sleeve including a shell wholly above the housing and hence wholly above said journalling means, said shell detachably secured to the sleeve, a compression spring in the shell sleeving the spindle and bearing down at its lower end on the top of the driver head, and a tension adjuster in threaded engagement with the upper part of the shell and sleeving the spindle and engaging the upper end of the spring.

2. A tool unit comprising a housing; a quill rotatable therein; a spindle within the quill; antifriction journalling means for the unit wholly located between the upper and lower limits of the housing; the quill at its upper portion extending above the top of the housing, and the spindle at its upper end extending above the top of the quill; a sleeve carrying at its lower end a spur pinion, said upper portion of the quill being extended into the lower end of the sleeve; means partially carried by the quill and partially carried by the housing for limiting downward movement of the quill relative to the housing; a driver head for the spindle sleeving the same and secured thereto and located in the sleeve above the quill, the sleeve being longitudinally slotted opposite the driver head and the latter having a lug extended into said slot; and a superstructure for the sleeve including a shell wholly above the housing and hence wholly above said journalling means, said shell detachably secured to the sleeve, a compression spring in the shell sleeving the spindle and bearing down at its lower end on the top of the driver head, and a tension adjuster in threaded engagement with the upper part of the shell and sleeving the spindle and engaging the upper end of the spring.

3. A tool unit comprising a housing; a quill rotatable therein; a spindle within the quill; antifriction journalling means for the unit wholly located between the upper and lower limits of the housing; the quill at its upper portion extending above the top of the housing, and the spindle at its upper end extending above the top of the quill; a sleeve carrying at its lower end a spur pinion, said upper portion of the quill being extended into the lower end of the sleeve; means partially carried by the quill and partially carried by the sleeve for limiting upward movement of the sleeve relative to the quill; a driver head for the spindle sleeving the same and secured thereto and located in the sleeve above the quill, the sleeve being longitudinally slotted opposite the driver head and the latter having a lug extended into said slot; and a superstructure for the sleeve including a shell wholly above the housing and hence wholly above said journalling means, said shell detachably secured to the sleeve, a compression spring in the shell sleeving the spindle and bearing down at its lower end on the top of the driver head, and a tension adjuster in threaded engagement with the upper part of the shell and sleeving the spindle and engaging the upper end of the spring.

4. A tool unit comprising a housing; a quill rotatable therein; a spindle within the quill; antifriction journalling means for the unit wholly located between the upper and lower limits of the housing; the quill at its upper portion extending above the top of the housing, and the spindle at its upper end extending above the top of the quill; a sleeve carrying at its lower end a spur pinion, said upper portion of the quill being extended into the lower end of the sleeve; means partially carried by the quill and partially carried by the housing for limiting downward movement of the quill relative to the housing; means partially carried by the quill and partially carried by the sleeve for limiting upward movement of the sleeve relative to the quill; a driver head for the spindle sleeving the same and secured thereto and located in the sleeve above the quill, the sleeve being longitudinally slotted opposite the driver head and the latter having a lug extended into said slot; and a superstructure for the sleeve including a shell wholly above the housing and hence wholly above said journalling means, said shell detachably secured to the sleeve, a compression spring in the shell sleeving the spindle and bearing down at its lower end on the top of the driver head, and a tension adjuster in threaded engagement with the upper part of the shell and sleeving the spindle and engaging the upper end of the spring.

5. A tool unit comprising a housing; a quill rotatable therein; a spindle within the quill; antifriction journalling means for the unit wholly located between the upper and lower limits of the housing; the quill at its upper portion extending above the top of the housing, and the spindle at its upper end extending above the top of the quill; a sleeve carrying at its lower end a spur pinion, said upper portion of the quill being extended into the lower end of the sleeve; a driver head for the spindle sleeving the same and secured thereto and located in the sleeve above the quill, the sleeve being longitudinally slotted opposite the driver head and downward from the top of the sleeve and the latter having a lug extended into said slot, antifriction means between each side of the lug and the adjacent side of the slot; and a superstructure for the sleeve including a shell wholly above the housing and hence wholly above said journalling means, said shell detachably secured to the sleeve, a compression spring in the shell sleeving the spindle and bearing down at its lower end on the top of the driver head, and a tension adjuster in threaded engagement with the upper part of the shell and sleeving the spindle and engaging the upper end of the spring.

6. A tool unit comprising a housing; a quill rotatable therein; a spindle within the quill; antifriction journalling means for the unit wholly located between the upper and lower limits of the housing; the quill at its upper portion extending above the top of the housing, and the spindle at its upper end extending above the top of the quill; a sleeve carrying at its lower end a spur pinion, said upper portion of the quill being extended into the lower end of the sleeve; a driver head for the spindle sleeving the same and secured thereto and located in the sleeve above the quill, the sleeve being longitudinally slotted opposite the driver head and the latter having a lug extended into said slot; antifriction means between each side of the lug and the adjacent side of the slot, each of said antifriction means including a plurality of balls each set in a separate recess in the lug, said recesses spaced along the lug so as to hold the balls out of contact with each other; and a superstructure for the sleeving including a shell wholly above the housing and hence wholly above said journalling means, said shell detachably secured to the sleeve, a compression spring in the shell sleeving the spindle and bearing down at its lower end on the top of the driver head, and a tension adjuster in threaded engagement with the upper part of the shell and sleeving the spindle and engaging the upper end of the spring.

7. A tool unit as defined in claim 6, in which there is a keying means partially carried by the driver head and partially carried by the spindle for causing the spindle to rotate with the driver head, and there is another means partially carried by the driver head and partially carried by the spindle for fixing the driver head longitudinally of the spindle at a selected point along the length of the latter.

ALFRED J. NOEL.